March 19, 1946. H. F. STORM 2,396,898
TIMING APPARATUS
Filed June 7, 1944
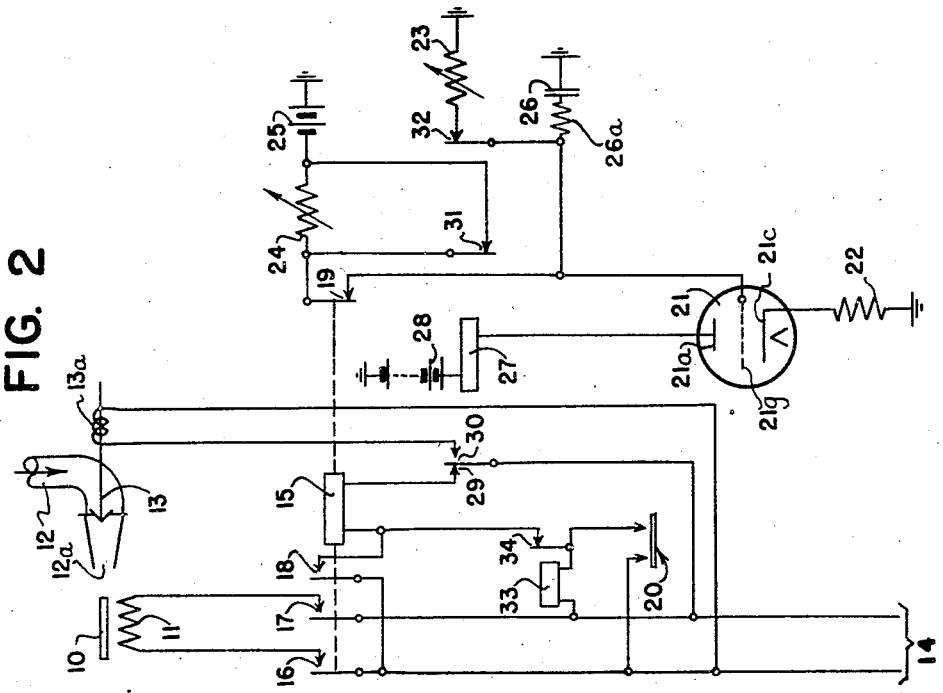
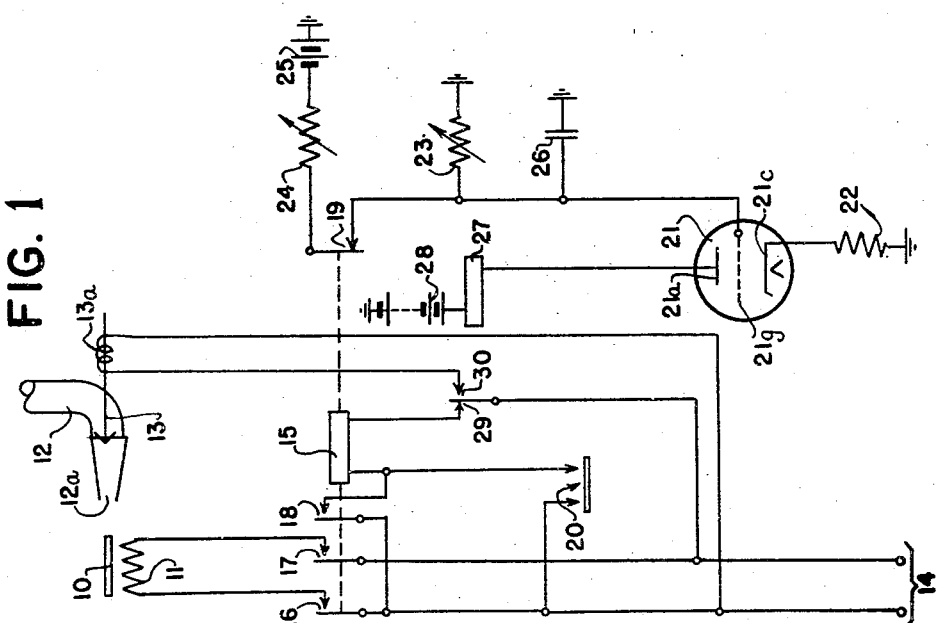
INVENTOR
HERBERT F. STORM
BY McCanna & Morsbach
ATTORNEYS Patented Mar. 19, 1946

2,396,898

UNITED STATES PATENT OFFICE 2,396,898

TIMING APPARATUS

Herbert F. Storm, West Allis, Wis., assignor to Chicago Flexible Shaft Company, Chicago, Ill., a corporation of Illinois Application June 7, 1944, Serial No. 539,104

11 Claims. (Cl. 161—15)

The present invention relates to timing apparatus and more particularly to improved apparatus for successively measuring two predetermined and non-overlapping time intervals.

In certain industrial applications, timing operations are required which entail the accurate measurement of two independent time intervals in succession. For example, in industrial processes of heat treating metalwork pieces, it is common practice to heat each work piece for a given increment of time in order to raise the temperature thereof to a quenching temperature, and to then quench the work piece in an oil or water bath or spray for a second predetermined time increment. Two mechanically or electrically interlocked electronic timers are at present conventionally used to effect the required time measuring operations in such an application, thus necessitating duplication of elements in the timing equipment, with a consequent high cost of such equipment.

It is an object of the present invention, therefore, to provide improved and exceedingly simple electrical timing apparatus which is positive and reliable in its operation to accurately measure two predetermined increments of time, and utilizes a minimum number of circuit elements.

It is another object of the invention to provide improved timing apparatus of the character described, which is operative to continue its time measuring functions on a recurrent or cyclic basis when a prescribed control is imposed upon the action thereof.

According to a further object of the invention, optional means are provided in the apparatus for positively limiting the operation of the apparatus to a single timing cycle composed of two successively measured time increments.

In accordance with a further and more specific object of the invention, the timing action is effected by utilizing a resistor-condenser combination consisting of a single timing condenser and condenser charge and discharge resistors, to so control the space current flow through an electron discharge tube that a timing relay having a winding traversed by the tube space current is operated between two settings to mark out or identify the measured time increments.

According to a still further object of the invention, each of the charge and discharge resistors is utilized to determine the length of one of the two time increments, and facilities are provided for preventing either of the two resistors from influencing the length of the time interval determined by the other resistor.

In accordance with still another object of the invention, adjustable condenser charge and discharge resistors are used, in order to provide for adjustment of the time increments respectively determined thereby.

The invention, both as to its organization and method of operation, together with further objects and advantages thereof, will best be understood by reference to the specification taken in connection with the accompanying drawing, in which:

Figure 1 schematically illustrates improved timing apparatus characterized by the features of the present invention; and Figure 2 illustrates a modified arrangement of the improved timing apparatus.

Referring now to the drawing, and more particularly to Fig. 1 thereof, the apparatus there illustrated may, for example, be utilized to control apparatus for hardening of ferrous metal parts, which are hereinafter designated as work pieces, one of which is schematically indicated at 10. To this end, electrically energized heating means in the form of a resistor 11 are provided for raising the temperature of each work piece 10 to a desired quenching temperature, and quenching facilities including a liquid or air conduit 12 are provided for projecting a quenching liquid or air against the heated work piece 10 at the end of the heating interval. More specifically, the heating resistor 11 is adapted to be energized from a current source, indicated by the bracketed terminals 14, through the contacts 16 and 17 of an electromagnetic contactor 15. The conduit 12 is connected to a compressed air source or to a suitable source of quenching liquid, such, for example, as water or oil, and is provided with an outlet nozzle 12a, from which the liquid or air may be projected in a stream against the heated work piece 10. An electromagnetic valve 13 is provided in the conduit 12 adjacent the outlet end thereof for starting and stopping the flow of quenching liquid or air through the nozzle 12a. This valve includes an operating winding 13a, also arranged for energization from the current source 14, and is normally spring biased to its closed position to prevent the quenching liquid or air from impinging upon the work piece 10 during the heating interval.

In order successively to energize the heating means 11 and the valve winding 13a for the predetermined increments of time respectively required to heat the work piece 10 to a quenching temperature and to then quench the work piece to a lower temperature, the present improved timing apparatus is provided. In brief, this apparatus comprises a three-element electron discharge tube 21 having input electrodes 21c and 21g which are bridged by a resistor-condenser timing network consisting of a timing condenser 26, an adjustable condenser charging resistor 24 and an adjustable condenser discharge resistor 23. With this arrangement, the condenser 26 is normally charged from the biasing battery 25 to a predetermined potential through the resistor 24 and contacts 19 controlled by the electromagnetic contactor 15, and may be discharged through the resistor 23. The terminals of this network are connected in series with an adjustable cathode biasing resistor 22 between the control grid 21g and cathode 21c of the tube 21, the polarity of the battery 25 included in the network being such that the tube is normally biased either beyond its space current cutoff point or to a point such that only a limited space current can traverse the space current path of the tube. The actual timing indications are provided by a timing relay 27 having its winding connected in series with a direct current source 28 and the biasing resistor 22 between the output electrodes 21a and 21c of the tube to form an output circuit for the tube. For the purpose of initiating a heating and quenching cycle and of concurrently initiating operation of the timing apparatus just described, a manually operable push button switch 20 of the self-restoring type is provided to control the energization of the electromagnetic contactor 15 from the current source 14.

In considering the operation of the timing apparatus, it will be understood from the above explanation that normally the condenser 26 is charged to a voltage somewhat lower than the voltage of the biasing battery 25. Thus it will be noted that the two resistors 24 and 23 in series constitute a voltage dividing circuit such that only that portion of the available battery voltage which appears across the resistor 23 is impressed across the terminals of the condenser 26. This voltage, i. e., that across the condenser 26, is negatively applied to the control grid 21g of the tube 21 and serves normally to so reduce the space current flow through this tube that the relay 27 remains in its released position.

When the push button switch 20 is momentarily actuated to initiate a heating and quenching cycle, a circuit is completed through the contacts 29 for energizing the winding of the contactor 15 from the current source 14. This contactor, in attracting its associated plunger or armature, closes its contacts 18 to complete an obvious locking circuit for itself. At its contacts 16 and 17, the contactor 15 completes an obvious circuit for energizing the heating means 11 from the current source 14, thereby to initiate the heating of the work piece 10. At its contacts 19, the contactor 15 interrupts the charging circuit for the condenser 26, thereby to initiate measurement of the first predetermined time increment, i. e., the interval during which heat is applied to the work piece 10 by the heating means 11. Immediately the contacts are opened, the condenser 26 starts to discharge through the discharge resistor 23, thereby to decrease the voltage negatively applied to the control grid 21g of the tube 21. As this grid bias is reduced, the space current traversing the winding of the timing relay 27 obviously increases until it acquires a magnitude sufficient to effect operation of this relay. The time increment separating the opening of the contacts 19 and the operation of the relay 27 is determined by the time constant of the resistor-condenser combination comprising the condenser 26 and the resistor 23, this interval being variable, within limits, as desired by suitable adjustment of the resistor 23 to change the time constant of the combination. Operation of the relay 27 marks the end of the work piece heating interval. Thus in operating this relay opens its contacts 29 to interrupt the locking circuit for the contactor 15, and closes its contacts 30 to complete an obvious circuit for energizing the valve winding 13a. The contactor 15 now opens its contacts 16 and 17 to deenergize the heating means 11, and at its contacts 18 opens another point in its own locking circuit. Thus heating of the work piece 10 is discontinued. At its contacts 19, the contactor 15 recompletes the circuit for charging the condenser through the charging resistor 24 from the battery 25. After this charging circuit is completed, the voltage across the condenser 26 starts to build up at a rate determined by the time constant of the timing network comprising the two resistors 23 and 24 and the condenser 26. As the voltage negatively applied to the control grid 21g of the tube 21 is thus increased, the space current flow through the winding of the relay 27 is correspondingly decreased. After a predetermined time interval required for the voltage across the condenser 26 to build up to a predetermined value, the magnitude of space current flow through the tube 21 is sufficiently decreased to cause the relay 27 to release. Upon restoring, this relay opens its contacts 30 to deenergize the winding 13a of the valve 13, and closes its contact 29 to reprepare the operating and locking circuits for the contactor 15. Thus the operation of the timing apparatus to successively measure the heating and quenching time intervals is completed. In this regard it will be understood that when the valve winding 13a is energized in response to operation of the timing relay 27, the valve 13 is opened permitting the pressured quenching liquid to stream outwardly through the jet nozzle 12a to impinge against the heated work piece 10. It will also be understood that the valve 13 is only held open for the duration of the second measured increment of time, i. e., the interval during which the timing relay 27 is operated. This interval may, within limits, be varied as desired by suitable adjustment of the variable resistor 24 to change the time constant of the timing network.

From the above explanation, it will be understood that if the push button switch 20 is manually held in its closed circuit position, the described heating and quenching cycle may be automatically repeated for an indefinite time interval. Thus if the switch 20 is closed at the instant the relay 27 releases to deenergize the valve winding 13a, the contactor 15 is immediately re-operated to re-initiate a new heating and quenching cycle under the control of the described timing apparatus. In certain applications this recurrent operation of the timing apparatus on a cyclic basis may be desirable. In the described application of metal heat treating, however, it is highly undesirable, since manual handling of the work pieces is necessary between successive heating and quenching cycles. In the Fig. 2 arrangement, means are provided for positively limiting the operation of the apparatus to a single cycle regardless of the position of the push button switch 20 at the instant the cycle is completed. These facilities include a slow-to-operate lockout relay 33, which is energized in parallel with the winding of the contactor 15, from the source 14 in response to operation of the switch 20 to its closed circuit position. When these two circuit elements are thus concurrently energized, the contactor 15 first closes its contacts 18 to complete the above described locking circuit for itself. Following this operation, the relay 33 opens its contacts 34 to interrupt the operating circuit for the contactor 15. Moreover, the relay 33 is held in its operated position so long as the switch 20 is maintained closed. Accordingly, if the switch 20 is not released during the initiated heating and quenching cycle, the contactor 15 is prevented from initiating a second heating and quenching cycle immediately after the first initiated cycle is completed.

From a consideration of the Fig. 1 circuit arrangement, it will also be apparent that each of the two measured increments of time, i. e., the heating and quenching intervals, is mutually dependent upon the resistance values of both resistors 23 and 24. Thus a variation in the resistance value of the discharge resistor 23 will not only alter the length of the heating interval, but will also change the length of the quenching interval. This is true for the reason that a change in the resistance of the resistor 23 will modify the current distribution in the network during the condenser charging interval. Similarly, a change in the resistance value of the resistor 24 to alter the length of the quenching interval will also affect the length of the heating interval, since the resistance value of the resistor 24 determines the magnitude of the bias voltage upon the control grid 21g of the tube 21 at the instant a timing operation is initiated.

In the Fig. 2 embodiment of the invention, facilities have been provided for making each of the two resistors 23 and 24 solely responsible for the measurement of one and only one of the two time increments involved in each heating and quenching cycle. In brief, these facilities comprise the contacts 31 carried by the timing relay 27 to normally short circuit the charging resistor 24, and additional contacts 32 also carried by the timing relay 27 to open the discharge path through the discharge resistor 23 during each interval when the condenser 26 is being charged from the battery 25 through the charging resistor 24. A small current limiting resistor 26a may be connected in series with the condenser 26, in order to prevent pitting of the contacts 32. With this arrangement, the condenser 26 is normally charged to the full potential of the battery 25, and is in no way affected by the resistance value of the charging resistor 24. Thus the length of the first measured time increment during each heating and quenching cycle is rendered entirely independent of the resistance value of the charging resistor 24. When the timing relay 27 operates at the end of this interval to effect the release of the contactor 15, the contacts 31 are opened to interrupt the path short circuiting the charging resistor 24, and the contacts 32 are opened to interrupt the discharge path through the resistor 23. Accordingly, when the contactor 15 releases and closes its contacts 19, the condenser 26 may be charged through the resistor 24 at a rate which is determined solely by the time constant of this resistor-condenser combination. Thereafter, and at the end of the second measured time interval, the timing relay 27 releases in the manner explained above and recloses its contacts 31 to again short circuit the charging resistor 24. In releasing, the relay 27 also closes its contacts 32 to recomplete the discharge path through the resistor 23. Thus the timing apparatus is conditioned for a new timing cycle. It will thus be apparent that by normally short circuiting the charging resistor 24 through the contacts 31 and by arranging for the interruption of this short circuiting path and the condenser discharge path at the beginning of the second or quenching time interval, the duration of each of the two measured intervals is predicated solely upon the resistance values of the two resistors 23 and 24, respectively.

While two embodiments of the invention have been disclosed, it will be understood that various modifications may be made therein without departing from the true spirit and scope of the invention.

I claim:

1. Timing apparatus for successively measuring two predetermined increments of time, comprising a timing condenser, means for charging and discharging said condenser, thereby to measure said two increments of time, a control device, means controlled in accordance with the charge on said condenser for operating said device to one setting at the end of one of said two increments of time and for operating said device to a second setting at the end of the second of said two increments of time, and means controlled by said device for controlling said charging and discharging means.

2. Timing apparatus for successively measuring two predetermined increments of time, comprising a timing condenser, means for alternately discharging and charging said condenser, thereby to measure said two increments of time, a control device, means controlled in accordance with the charge on said condenser for operating said device to one setting at the end of one of said two increments of time and for operating said device to a second setting at the end of the second of said two increments of time, and means for controlling said charging and discharging means to initiate the measurement of said one increment of time and controlled by said control device to also initiate the measurement of said second increment of time.

3. Timing apparatus for successively measuring two predetermined increments of time, comprising a timing condenser, a circuit including means for normally charging said condenser to a first predetermined voltage, a discharge path shunting said condenser, a control device, means controlled in accordance with the voltage across said condenser for operating said device to one setting when said condenser voltage is reduced from said first predetermined value to a second predetermined value, thereby to measure one of said two increments of time, and for operating said device to a second setting when said condenser voltage is increased from said second predetermined value to said first predetermined value, thereby to measure the other of said two increments of time, means for interrupting said charging circuit, and means controlled by said control device for recompleting said charging circuit at the end of said one increment of time.

4. Timing apparatus for successively measuring two predetermined increments of time, comprising a timing condenser, a circuit including means for normally charging said condenser to a first predetermined voltage, a discharge path shunting said condenser, a control device, means controlled in accordance with the voltage across said condenser for operating said device to one setting when said condenser voltage is reduced from said first predetermined value to a second predetermined value, thereby to measure one of said two increments of time, and for operating said device to a second setting when said condenser voltage is increased from said second predetermined value to said first predetermined value, thereby to measure the other of said two increments of time, a switch, and means responsive to the operation of said switch for interrupting said charging circuit and responsive to operation of said control device to said one setting for recompleting said charging circuit.

5. Timing apparatus for successively measuring two predetermined increments of time, comprising a timing condenser, a circuit including means normally charging said condenser to a first predetermined voltage, a discharge path shunting said condenser, means for interrupting said charging circuit, thereby to effect a discharge of said condenser over said path, a control device operative from a normal setting to a second setting to indicate the expiration of a first measured time interval in response to the decrease in voltage across said condenser to a second and lower predetermined value, and means responsive to operation of said control device to said second setting for recompleting said charging circuit, said control device being operative from said second setting to said normal setting in response to the resulting increase in the voltage across said condenser to said first predetermined value, thereby to indicate the expiration of a second measured time interval.

6. Timing apparatus for successively measuring two predetermined increments of time, comprising a timing condenser, a circuit including means for normally charging said condenser to a first predetermined voltage, a discharge path shunting said condenser, a control device, means controlled in accordance with the voltage across said condenser for operating said device to one setting when said condenser voltage is reduced from said first predetermined value to a second predetermined value, thereby to measure one of said two increments of time, and for operating said device to a second setting when said condenser voltage is increased from said second predetermined value to said first predetermined value, threreby to measure the other of said two increments of time, variable resistors respectively included in said charging circuit and said discharge path to determine the lengths of said two increments of time, and means for interrupting said charging circuit and controlled by said control device for recompleting said charging circuit at the end of said one increment of time.

7. Timing apparatus comprising a condenser, a charging circuit including a current source normally connected across said condenser, a discharge path including a resistor, means for interrupting said charging circuit and for discharging said condenser through said discharge resistor, thereby to measure one predetermined increment of time, a charging resistor, an electron discharge tube including input electrodes bridged by said condenser so that the space current flow therethrough is determined by the charge on said condenser, an output including the space current path through said tube, a relay provided with a winding serially included in said output circuit and operable at the end of said predetermined increment of time, and means responsive to operation of said relay for interrupting said discharge path and for charging said condenser from said source over said circuit through said charging resistor, thereby to measure a second predetermined time interval.

8. Timing apparatus comprising a condenser, a charging circuit including a current source normally connected across said condenser, a discharge path including a resistor, means for interrupting said charging circuit and for discharging said condenser through said discharge resistor, thereby to measure one predetermined increment of time, a charging resistor, means for interrupting said discharge path and for charging said condenser from said source over said circuit through said charging resistor, thereby to measure a second predetermined time interval, and means responsive to an increase in the charge on said condenser to a predetermined value for excluding said charging resistor from said charging circuit at the end of said second predetermined time interval.

9. Timing apparatus comprising a condenser, an electron discharge tube provided with input and output electrodes, an output circuit bridging said output electrodes, a timing relay including a winding serially connected in said output circuit, means connecting said condenser across said input electrodes, whereby the current traversing said winding is determined by the voltage across said condenser, a condenser charging circuit including a current source normally connected across said condenser, a discharge path including a resistor, means for interrupting said charging circuit and for discharging said condenser through said discharge resistor, thereby to initiate measurement of one predetermined increment of time, a charging resistor, means controlled by said relay for interrupting said discharge path and for charging said condenser from said source over said circuit through said charging resistor, thereby to terminate said first time increment and to initiate measurement of a second predetermined increment of time, and means controlled by said relay for excluding said charging resistor from said charging circuit at the end of said second predetermined increment of time.

10. In timing apparatus for energizing two control circuits during successive and non-overlapping time intervals, an electron discharge tube provided with input and output electrodes, an output circuit bridging said output electrodes, a timing relay including a winding serially connected in said output circuit, a condenser connected across said input electrodes, whereby the current traversing said winding is determined by the voltage across said condenser, a charging circuit including a current source normally connected across said condenser, a normally complete discharge path shunting said condenser and including a resistor, means for completing one of said two control circuits and for concurrently interrupting said charging circuit, thereby to permit discharge of said condenser through said discharge resistor and thus initiate measurement of one predetermined interval of time, a charging resistor, means controlled by said relay for interrupting said discharge path and for charging said condenser from said source over said charging circuit through said discharge resistor, thereby to terminate measurement of said first time interval and to initiate measurement of a second predetermined interval of time, means operative concurrently with said last named means for interrupting said one control circuit and for completing the other of said control circuits, and means controlled by said relay for excluding said charging resistor from said charging circuit at the end of said second predetermined increment of time.

11. In timing apparatus for energizing two control circuits during successive and non-overlapping time intervals, an electron discharge tube provided with input and output electrodes, an output circuit bridging said output electrodes, a timing relay including a winding serially connected in said output circuit, a condenser connected across input electrodes, whereby the current traversing said winding is determined by the voltage across said condenser, a charging circuit including a current source normally connected across said condenser, a normally complete discharge path shunting said condenser and including a resistor, means for completing one of said two control circuits and for concurrently interrupting said charging circuit, thereby to permit discharge of said condenser through said discharge resistor and thus initiate measurement of one predetermined time interval, a charging resistor, means controlled by said relay for interrupting said discharge path and for charging said condenser from said source over said charging circuit through said charging resistor, thereby to terminate measurement of said first time interval and to initiate measurement of a second predetermined time interval, means operative concurrently with said last-named means for interrupting said one control circuit and for completing the other of said control circuits, and means controlled by said relay for excluding said charging resistor from said charging circuit at the end of said second predetermined time interval, said resistors being adjustable to change the lengths of said two increments of time.

HERBERT F. STORM.